C. L. BUCKINGHAM.
RETORT FURNACE AND CONDENSING APPARATUS FOR THE EDUCTION OF OIL AND FUEL GAS FROM OIL SHALES AND OIL SANDS.
APPLICATION FILED FEB. 1, 1921.
1,425,074.
Patented Aug. 8, 1922.
5 SHEETS—SHEET 1.
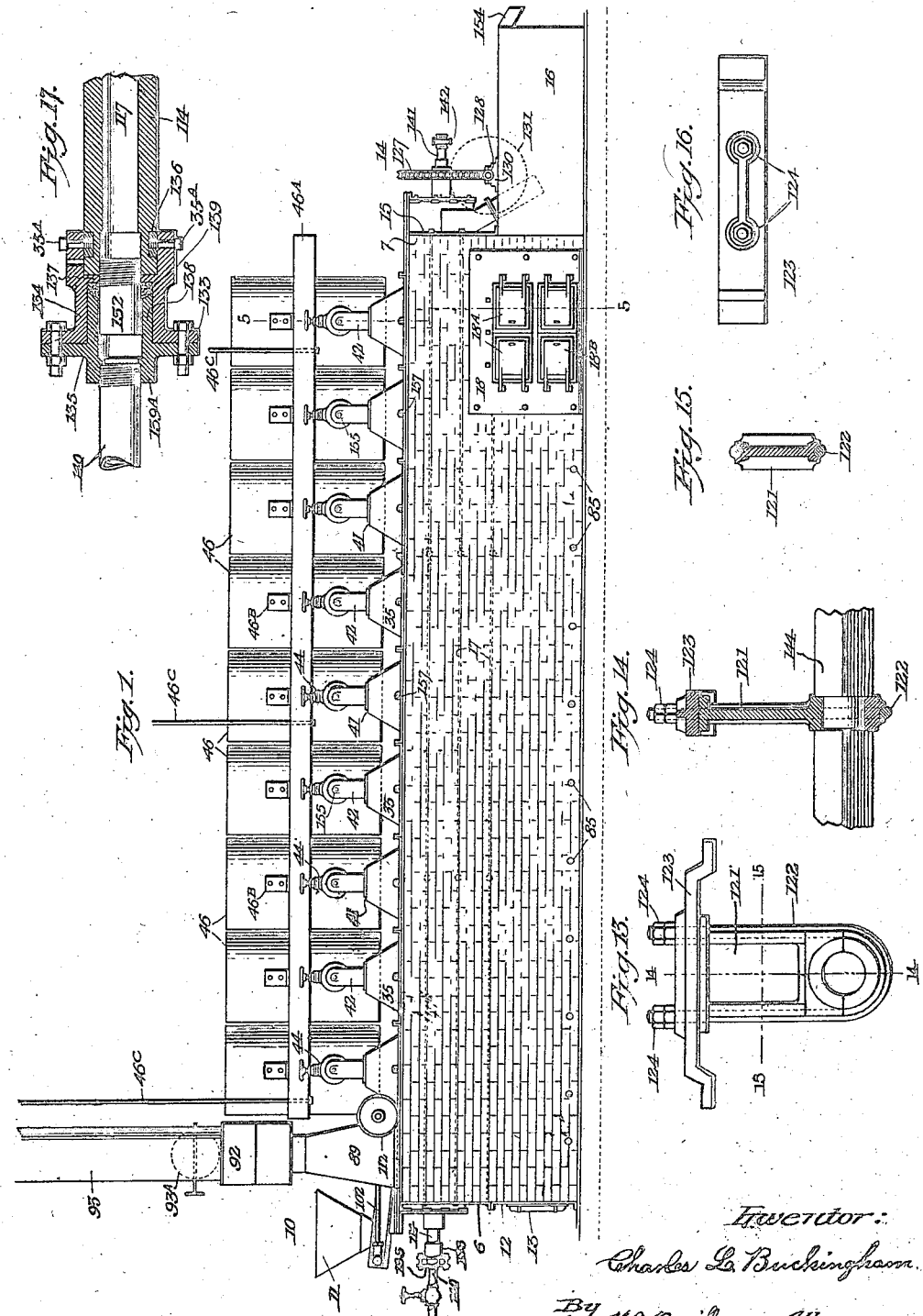

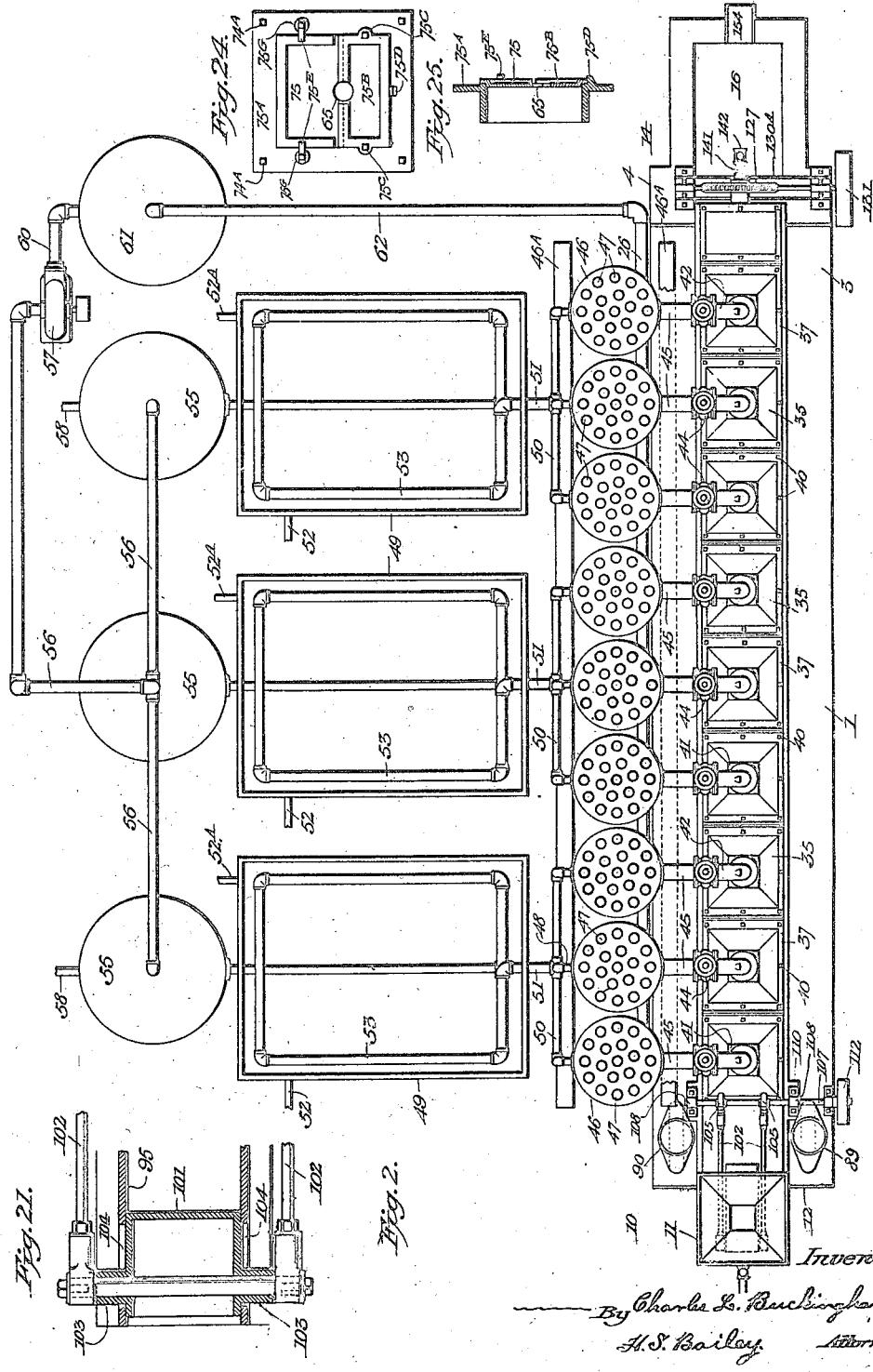

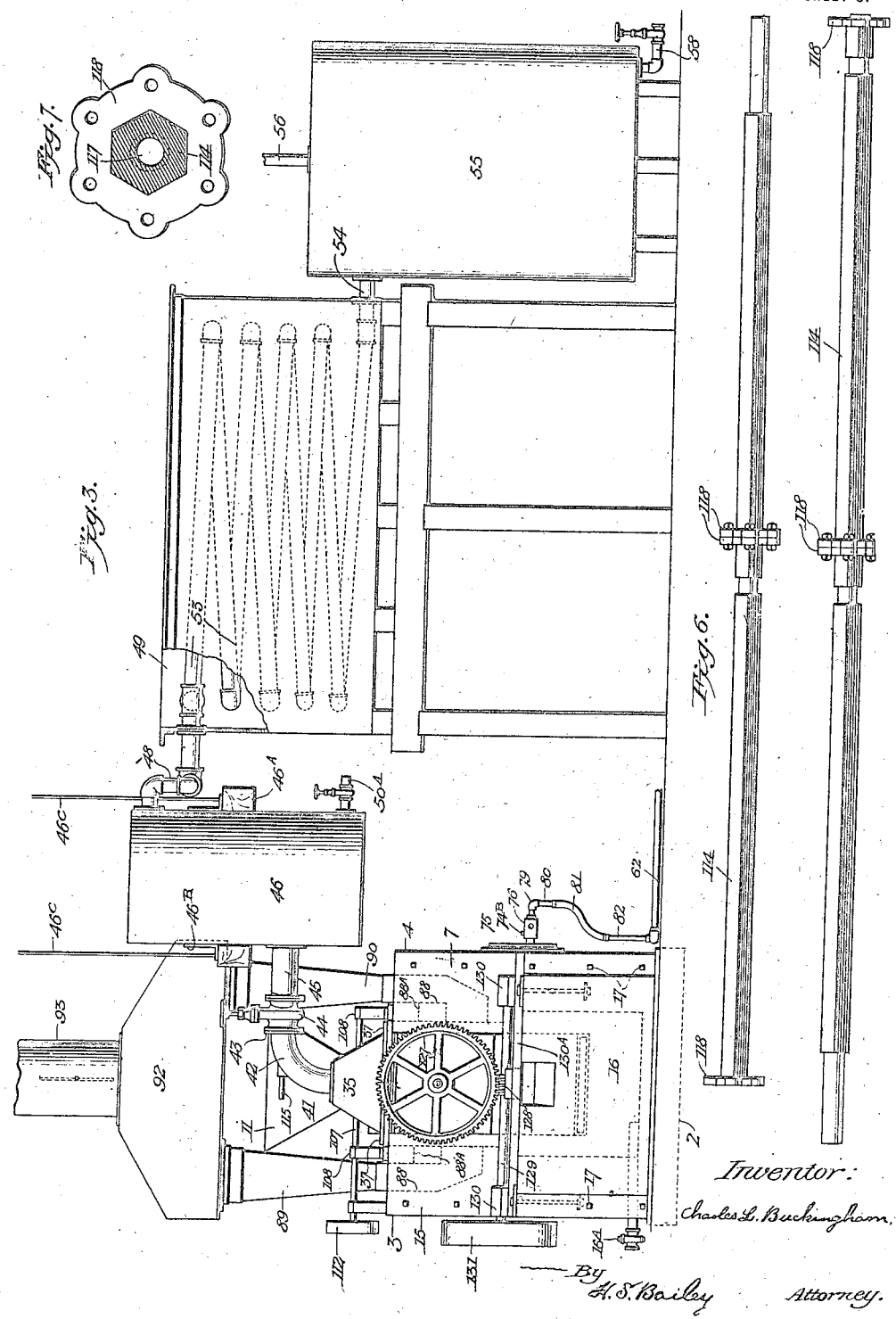

C. L. BUCKINGHAM.
RETORT FURNACE AND CONDENSING APPARATUS FOR THE EDUCTION OF OIL AND FUEL GAS FROM OIL SHALES AND OIL SANDS.
APPLICATION FILED FEB. 1, 1921.
1,425,074.
Patented Aug. 8, 1922.
5 SHEETS—SHEET 4.
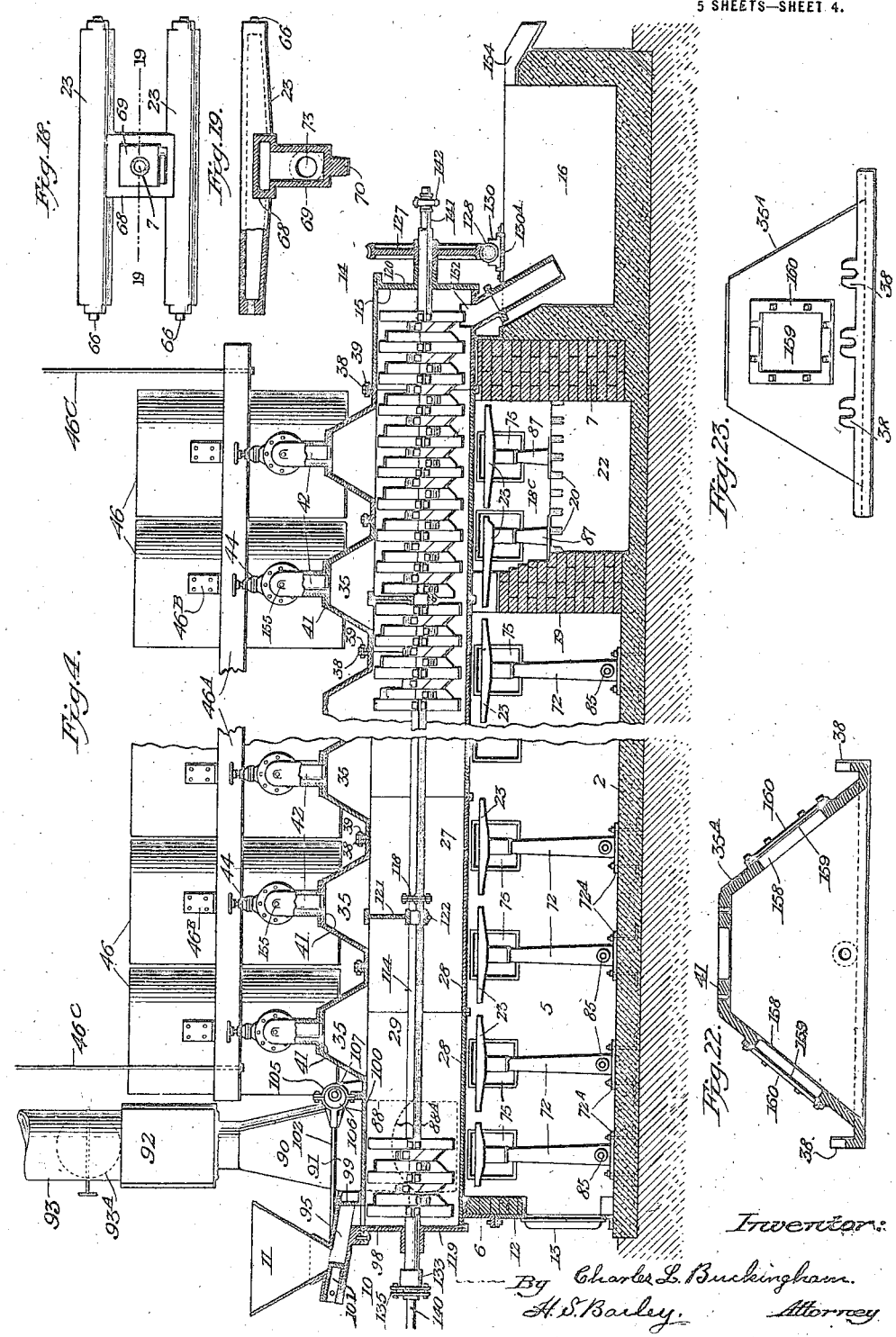
Inventor:
By Charles L. Buckingham.
H. S. Bailey. Attorney C. L. BUCKINGHAM.
RETORT FURNACE AND CONDENSING APPARATUS FOR THE EDUCTION OF OIL AND FUEL GAS FROM OIL SHALES AND OIL SANDS.
APPLICATION FILED FEB. 1, 1921.
1,425,074.
Patented Aug. 8, 1922.
5 SHEETS—SHEET 5.
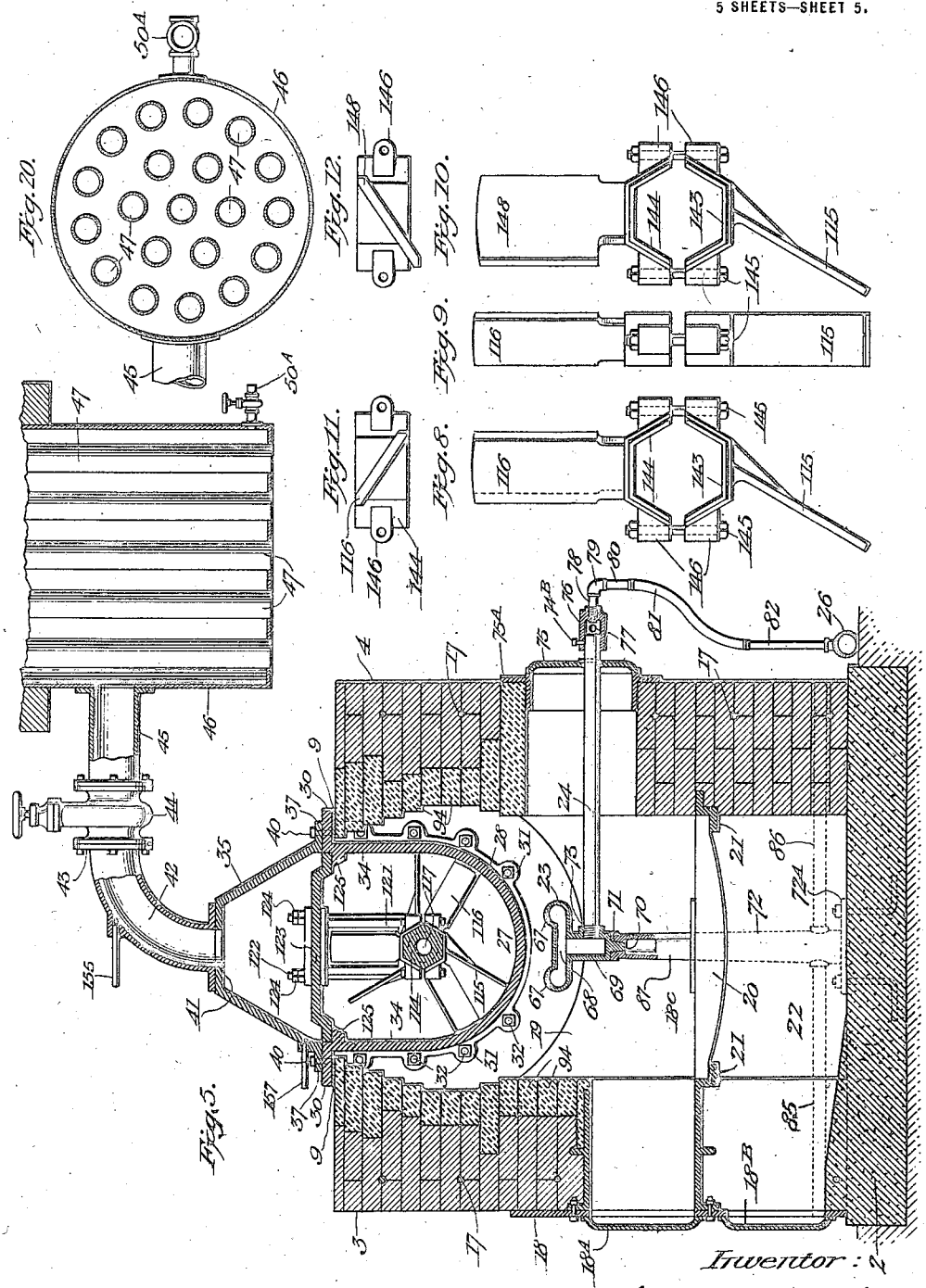
Inventor:
By Charles L. Buckingham.
H. S. Bailey  Attorney.

UNITED STATES PATENT OFFICE.

CHARLES L. BUCKINGHAM, OF DENVER, COLORADO.

RETORT FURNACE AND CONDENSING APPARATUS FOR THE EDUCTION OF OIL AND FUEL GAS FROM OIL SHALES AND OIL SANDS.

1,425,074.   Specification of Letters Patent.   Patented Aug. 8, 1922.

Application filed February 1, 1921. Serial No. 441,604.

*To all whom it may concern:*

Be it known that I, CHARLES L. BUCKINGHAM, a citizen of the United States of America, residing at the city and county of Denver and State of Colorado, have invented a new and useful Retort Furnace and Condensing Apparatus for the Eduction of Oil and Fuel Gas from Oil Shales and Oil Sands, of which the following is a specification.

My invention relates to a new and improved retort furnace and condensing apparatus for the eduction of oil and fuel gas from oil shales and oil sands.

And the objects of my invention are:

First: To provide an automatically operating and continuously oil shale feeding, treating and discharging retort.

Second: To provide a combined oil shale and oil sand treating retort and air cooled vapor condensing apparatus, the air cooled vapor condensing apparatus of which is divided into a plurality of oil shale vapor receiving and condensing units.

Third: To provide an oil shale and oil sand treating and condensing apparatus that is especially designed to allow for expansion and contraction and still be gas-vapor tight, and in which coal, wood, gas or other fuel may be burned to produce the oil shale, or sand treating heat in the retort. And Fourth: To provide a retort furnace and a cooperating condensing apparatus, the retort portion of which comprises a completely enclosed air tight retort that is provided with means for receiving and feeding through it, oil shales, rock and sand, and that is arranged to impart an indirect heat treatment to the oil shale and sands, that will volatilize the volatile elements in them, into a vaporous gas.

And the furnace portion of my retort furnace comprises a fuel burning furnace structure that is arranged to support and heat said retort, and the condensing apparatus portion of my retort furnace comprises air cooled and submerged condensers and refining tanks arranged and adapted to receive from said retort portion of my retort furnace the vaporous gases generated in said retort from said oil shale rock and sands, and condense them to extract the oil therefrom for commercial uses, and to use the fuel gas obtained therefrom, as fuel to heat the furnace portion of my retort furnace.

I attain these objects by the mechanism illustrated in the accompanying drawings, in which:

Figure 1 is a side elevation of the improved retort and condensing apparatus.

Fig. 2 is a plan view of the same.

Fig. 3 is an elevation looking toward the discharge end of the apparatus.

Fig. 4 is a vertical, longitudinal, sectional view of the retort—slightly enlarged—a portion of the length of the same being omitted for lack of space, numbers of the rabbling elements also being omitted to give a clear view of the operating shaft.

Fig. 5 is a transverse, sectional view, on a still further enlarged scale, of the retort and one of the condensers, taken on the line 5—5 of Figure 1.

Fig. 6 is a side view of the four-part rabbler supporting and operating shaft, the shaft being uncoupled at its middle joint, and the two half parts thereof being shown one above the other.

Fig. 7 is an enlarged transverse sectional view of the shaft.

Figs. 8 and 9 are end and front views, respectively, of the main form of rabbler.

Fig. 10 is an end view of a rabbler having a slightly wider advancing blade.

Fig. 11 is a top view of Figure 8.

Fig. 12 is a top view of Figure 10.

Fig. 13 is a front view of one of the shaft hangers, showing the cross bar which supports the same.

Fig. 14 is a vertical sectional view of the same on the line 14—14 of Figure 13.

Fig. 15 is a horizontal sectional view on the line 15—15 of Figure 13.

Fig. 16 is a top view of the hanger supporting cross bar.

Fig. 17 is a sectional view of the packing box on the forward end of the operating shaft.

Fig. 18 is a view of the underside of one of the twin burners which are supported beneath the retort.

Fig. 19 is a vertical sectional view of the same on the line 19—19 of Figure 18.

Fig. 20 is a horizontal sectional view of one of the condensers.

Fig. 21 is a fragmental, horizontal, sectional view, showing a portion of the feed spout for the shale, the reciprocating plunger therein, and the eccentric rods which operate the plunger.

Fig. 22 is a vertical, sectional view of a modified form of the vapor dome.

Fig. 23 is a side view of the same.

Fig. 24 is a front view of one of the two-part look-in doors and its frame. And

Fig. 25 is a vertical sectional view of the same.

Similar letters of reference refer to similar parts throughout the several views.

Referring to the drawings:

The numeral 1, illustrates a side elevation view of a retort embodying my invention, which retort preferably consists of a square or rectangular shaped heat generating retort adapted to treat oil shales and oil sands, and it comprises a foundation or footing or base plate 2, that is preferably made of concrete, and two opposite side walls 3 and 4, with a flue space 5, between them. The side walls are preferably made of brick; and it is also provided with brick front and rear walls 6 and 7, and to the inner edges of the walls, plates 9 are fixed. The end 10, of the retort furnace is its oil shale feeding-in end, and its roof 8, is provided with an oil shale receiving hopper 11. The front end wall 6, is covered by a front plate member 12, that is preferably made in two substantially equal half parts, which are divided crosswise of their height and are arranged to be bolted together. The lower part of this front end piece of the retort is provided with doors 13, which form an entrance into the flue space 5, between the two side walls 3 and 4.

The rear or tailings discharge end 14, of the retort is also covered with a cast iron plate 15, that surrounds the inner end of a tailings receiving tank 16, which I preferably construct of concrete.

These two cast iron end plates 12 and 15, are bolted against the end walls and also together, by long bolts 17, that extend longitudinally through the brick side walls 3 and 4. These long bolts 17, preferably are made of short pieces 17$^A$, the meeting ends of which are provided with hooks and eyes, which arrangement enables these bolts to be separated at any point in the length of the retort where it may be necessary to remove the bricks in either side wall, to make repairs to the mechanism within the walls.

These longitudinal bolts extend through the two end plates and their ends are threaded and are provided with washers and nuts, and they are spaced at suitable distances apart in the height of these front and rear end plates to clamp them rigidly to the opposite ends of the brick work and to also clamp the brick work endwise together to at it from cracking from the expansion and contraction forces that affect the brick work and the cast and wrought iron parts of the retort that are supported by and are secured to the brick sides and ends of the retort.

A cast iron fire box frame 18, is secured by bolts to the front side wall of the furnace, which is provided with fuel entrance doors 18$^A$, and also with ash pit doors 18$^B$, and inside of the frame 18, a heat producing coal or wood or other fuel combustion fire box 18$^C$, is positioned at the tailings discharging end of the retort and consists of a bridge wall 19, that extends across the flue space 5, from the inside of one side wall to the other, and between the inside of this fire wall and the insides of the side walls and the end wall, a grate 20, is supported on shelf portions 21, at a suitable distance above the concrete foundation, to form an ash pit space 22.

I also provide this fire box with gas burning burners 23 and gas supplying pipes 24. My invention also contemplates the installation of a plurality of gas burners placed at predetermined distances apart throughout the length of the flue space, and I have illustrated gas supplying pipes 24, extending into and through one side wall of the retort, each of which is connected to a main pipe 26, that leads to a supply of fuel gas, as will be fully described hereinafter.

Between the top portions of the side walls, I place an oil shale receiving and treating retort 27, that comprises casings 28, in which there is an open chamber 29, into which and through which the oil shale is fed. The oil shale treating retort is preferably a yoke-shaped trough in cross section, and the upper edges of its sides are provided with laterally extending flanges 30, that rest on top of the plates 9, and are free to move slightly on them when expanded by the heat of the furnace portions of the retort.

The oil shale receiving and treating retort is preferably made of cast iron and it extends the entire length of the retort furnace. It is, however, constructed in sections, and the opposite ends of each section are provided with outwardly projecting flanges 31, and the sections are bolted together by bolts 32. The chambered retort casing is preferably yoke-shaped in cross section and its lower end is of semicircular shape, and its inner side forms a substantially half part of a true circle, while its sides 34, extend through, up to the top of the roof plates 9, on which its side flanges 30, rest.

To the top of this chambered retort, I secure at predetermined parts of its length, a number of oil shale vaporized gas receiving domes 35, the interior chamber portion of each of which is of the same width as the upper end of the chamber 29, and registers with it, so that the gases generated in the chamber of the retort rise unobstructed into the domes. I preferably illustrate nine of these vaporized oil shale gas receiving domes and they extend along the top of the entire length of the shale treating chamber of the retort.

These oil shale vaporized gas domes are made in equal sizes, and they are provided with outwardly projecting flanges 37, at their lower ends, and their end flanges are provided with machine finished upwardly projecting lugs 38, that are bolted together by bolts 39. The base flange of each dome extends around and along their opposite sides, and it is bolted by bolts 40, to the top of the side flanges of the casing of the shale treating chamber of the retort.

These domes taper convergingly upward from their bases in pyramidal form, to a small flat flanged outlet top portion 41, to which one end of an elbow 42, is bolted, the opposite end of which is formed with a flange 43, which is bolted to a corresponding flange on one side of a valve 44, to the opposite side of which a pipe 45, having flanged ends, is connected, that extends to and is bolted to the lower part of an air cooled condenser 46, which preferably comprises a cylindrical tank that is provided with closed ends and contains a plurality of tubes 47, that extend through it and are secured in its opposite end so that the ends of all of the tubes are open to the flow of the atmosphere through them, while the vaporized gas that flows into these condensing tanks circulates around the air cooled pipes and fills these tanks and flows out of them through a pipe 48, into a submerged coil condensing tank 49. Each one of the domes is connected by its elbow and its valve controlled pipe to an air cooled condenser, as is illustrated in Figure 2. Consequently, there are nine of these air cooled condensers connected to the nine vaporized gas collecting domes. The nine air cooled condensers are preferably connected together in groups of three tanks in each group, by piping 50. Each tank has an oil draw-off valve 50$^A$, at its lower end. The condensers 46, are supported upon parallel timbers 46$^A$, by means of angle plates 46$^B$, which are bolted to the condensers and to the said timbers; and the timbers are suspended from the rafters, or ceilings, as the case may be, of the building in which the apparatus is installed, by rods 46$^C$.

The air cooled condensing tanks of each one of these three groups of tanks is connected by a pipe 51, to one of the submerged pipe coil condensers 49, that is completely enclosed, and which is kept full of a flowing stream of water, that enters from a pipe 52, and flows out through a pipe 52$^A$. These three submerged coil condensers consist, preferably, of a square shaped tank 49, with a square shaped coil of piping 53, very loosely in it, and the tanks are made deep enough to hold a number of vertically arranged square coils of pipe, the top one of which is connected by the pipe to the air cooled condenser's discharge pipe 51, and the bottom pipe of the coil is connected to an outlet pipe 54, that extends through the rear wall 7, of each tank, and is connected to an oil and gas refining tank 55, of which there are three, one for each coil tank. These gas refining tanks are preferably cylindrical in shape, and are provided with a gas outlet pipe 56, that leads to an exhaust fan or blower 57, and also with an oil drawing-off valve controlled pipe 58.

The gas that collects in the three tanks 55, is fuel gas, and these tanks are connected together by piping 56, and a pipe 60, extends from the blower 57, to a reservoir or service tank 61, from which a pipe 62, extends to the main supply pipe 26, that is placed along the rear side wall 4, of the furnace.

In addition to the coal or wood burning fire box for heating the retort, I employ the fuel gas obtained from the shale by means of the condensers and refining tanks, and I apply the gas flames through burners arranged underneath the retort throughout its whole length, and I preferably use gas burners 23, that are of special construction and are arranged in pairs side by side, and I also preferably make all of them, except the front end burner, between twenty-four and thirty inches long. The opposite ends, of these burners 23, are provided with threaded apertures that are closed by plugs 66, which can be removed when it is necessary to clean the inside of the burners.

Each pair of burners is provided with three rows of small gas jet escaping and burning apertures 67, that extend along the upper surface, and the two burners of each pair of burners are connected in parallel alignment with each other at a short distance apart, by a center cross piece 68, that is hollow and that is provided with a depending hollow hub portion 69, the lower end of which is provided with a depending tapering stem 70, that fits snugly, but loose enough, into a tapered aperture 71, to be easily lifted out of it, which is formed in the top end of a hollow pedestal 72. I preferably place ten of these pedestals in the flue space between the side walls of the retort and between its shale feeding-in end and the bridge wall of the fire box, and I provide each pedestal with a projecting foot plate 72$^A$, that rests on and is bolted to the concrete foundation footing of the retort furnace. These ten pairs of gas burners are arranged in end to end alinement with only a small space between them, throughout the length of the bottom of the retort, and the pedestals are of a height to allow their gas flames to flow close to the semicircular curved bottom portion of the retort.

The depending hollow hub portion 69, of each pair of gas burners is provided with a threaded inlet aperture 73, to which one end of the pipe 24, is connected, the opposite end of which extends through a look-in door 75, of which there is one for each pair of gas burners in the rear side wall of the furnace, and the other end of this pipe is connected to a coupling 76, that is provided with an air inlet aperture 77, and a gas inlet aperture and a pipe 78. The gas inlet pipe is connected to an elbow 79, and a pipe 80, is connected at one end to it, and at its opposite end is connected to one end of a piece of rubber hose 81, the opposite end of which is connected to one end of a pipe 82, the opposite end of which is connected to the main gas supplying pipe 26; the coupling 76, is secured on the end of the pipe 24, by a set screw 74$^B$, in order to enable the coupling to be moved on the pipe to uncover more or less of the inlet aperture 77, in the side of the coupling. Consequently, by adjusting the coupling on the pipe 24, I can vary the amount of air in proportion to the amount of gas flowing into the burners to make a mixture that will provide the hottest flame obtainable from the burners.

The look-in door 75, is a two-part door, and it consists of a square frame 75$^A$, that is secured to the rear side wall 4, of the furnace and of the retort by anchor bolts 74$^A$. The look-in door 75, forms only the top part of the full door portion that covers the door frame 75$^A$, the lower part 75$^B$, of which is secured to the frame by bolts 75$^C$, and its lower end rests on a lug 75$^D$, that is formed on the frame.

The look-in door portion 75, is, however, clamped by straps 75$^E$, which are bolted to lugs 75$^G$, that are cast on the frame 75$^A$, the straps extending over onto the adjacent sides of the look-in door. This arrangement allows me to remove the look-in part of this door very quickly, as when the cap screws are loosened, the straps will swing down and then this look-in part of the whole door can be lifted from the top edge of the fixed lower part, which has a shouldered top edge portion that laps over onto the lower edge of the upper removable part, which I term the look-in part.

The gas inlet pipe 24, extends through a recess 65, that is formed partially in the meeting edges of the two-part door, but the look-in part lifts up off of the upper part of the pipe 24, when it is removed from the frame 75$^A$.

All of the hollow pedestals that support the gas burners are provided with air inlet and exit pipes 85, and 86, through which cold air flows naturally, but may be forced into them if desired, to keep them cool enough to resist the harmful action of the heat in the burners, or of the fuel in the fire box, or of the gas burners.

I also place a pair of gas burners in the fire box, which are removably supported on the top of a short pedestal 87, that rests loosely on the top of the grate bars.

The heat from the fuel used, such as coal or wood or oil, that is generated in the fire box flows over the bridge wall 19, and along the flue space 5, under and in contact with, and up around the bottom and sides of the casing of the retort, and flows to the front end of the flue and the retort, and flows around the opposite sides of the front end of the retort, through two vertical flue spaces 88, that are formed in the inside surfaces of the side walls that extend up behind arches 88$^A$, that are built in the inside surface of the walls to support the brick work and the roof plates and side plates of the retort. To the top of these flues I secure the lower ends of two flue pipes 89 and 90, that are secured at their lower ends to necks 91, that are formed on the upper faces of cover plates 100, of the adjoining top portions of the retort. The upper ends of these two flue pipes 89 and 90, are connected to the opposite end portions of the bottom of a smoke collecting breeching hood 92, to the central portion of the top of which a smoke stack 93, is connected.

The heat of the gas burners also flows up against and around the whole length of the lower curved bottom portion of the retort, more evenly and directly, however, than from the fire box alone, and the waste heat and smoke from them escapes through the flues and smoke stack mentioned, which is provided with a damper 93$^A$.

The upper portion of the bricks on the inner sides of the side walls of the heat producing furnace portion of the retort are preferably projected inwardly to approach close to the upper ends of the upper sides of the outside surface of the casing of the retort, and I preferably line the hottest parts of the inside surfaces of these walls with fire bricks 94.

The oil shale feeding-in end of the shale treating retort 27, is provided with an oil shale feeding hopper 11, that has a discharging spout 95, formed integral with it. This hopper and feed spout consists of a funnel-shaped portion 11, that is placed a short distance away from the feeding-in end of the retort, and that is provided at its narrow lower end with the discharge aperture 95, through which the oil shale discharges into the retort. The oil shale discharging spout of the hopper extends across the bottom of the hopper in both directions from it, and its inner end extends over and rests on top of the adjacent end of the retort.

The bottom of the discharge spout is provided with a discharge aperture 98, that allows the oil shale to drop through it into the chamber 27, of the retort. The inner end of the spout portion 95, of the hopper is closed by an end plate 99, and the cover plate 100, extends from this end plate over and rests on top of the side flanges 30, of the retort, and is bolted to them, and extends to and is bolted to the end foot plate of the adjacent gas dome 35, of the retort.

The interior of the feed spout portion of the hopper is provided with a reciprocating plunger 101, and the spout and its plunger are preferably of rectangular shape in cross section.

The feed spout extends outwardly from the hopper far enough to receive this piston plunger, which has a short reciprocating movement across the outlet aperture in the bottom of the hopper, and the piston plunger is reciprocated by a pair of eccentric rods 102, that are connected at one end to trunnions 103, that are formed on the opposite sides of the piston plunger and that extend beyond the adjacent end of the spout, which are provided with slots 104, in which they move; the opposite ends of the connecting rods are adjustably connected to a pair of eccentric straps 105, that are operatively mounted on eccentric disks 106, which are secured to a shaft 107, that is rotatably mounted in bearings 108, that are formed in pedestals 109, that are bolted to lateral projections 110, of the flanges 30, of the adjacent retort section.

The shaft 107, of these eccentrics is rotated by a belt driven pulley 112, that is secured on one end of it.

The oil shale that is fed into the hopper from its source of supply drops into the spout and is pushed by the reciprocating strokes of the plunger into the front end of the chamber of the retort, where it is engaged and rabbled and fed forward through the retort, and discharged from it by a rotating shaft 114, which I term the oil shale propelling shaft, and its surrounding and radiating and rotating rabbling blades 115, and its forwardly feeding blade's inclined blades 116.

This shale propelling shaft, with its rabbling and forwardly feeding mechanism is preferably a hexagon-shaped cast iron tubular form of shaft, that is provided with a large axial hole 117, that extends entirely through it from end to end, the opposite entrance ends of which are adapted to receive pipe and other connections that are arranged to convey cold water or compressed air through it as desired, to keep it cool, as will be presently described.

While I might use a steel or wrought iron propeller shaft, I preferably use one that is cast of cast iron and that is made in pieces, the meeting ends of which are provided with flanges 118, and are bolted together.

I mount the propeller shaft in the axial center of the semicircular bottom portion of the chamber of the retort, and support it at its opposite ends in the end plates 119 and 120, which are secured to the opposite ends of the retort, and at three parts of its length it is supported in two-part hanging journal boxes 121, that fit around neck portions formed in the shaft to receive them. The boxes 121, are supported in yoke-shaped bolts 122, the curved portions of which fit in grooves formed around the lower half of the box, and in grooves formed in the opposite sides of the upper wall of the box. The free ends of the yoke-shaped bolts extend loosely up through crass-bars 123, and they are provided with threaded ends and nuts 124, by which they may be vertically adjusted to tighten the two half-boxes on the shaft. The opposite ends of these cross bars 123, rest on the top of lugs 125, that are cast on the inside of the casing of the retort, and the ends of the cross bars are free to move longitudinally by the expansion and contraction movements of the retort under the varying degrees of heat it will be subjected to from the fire box or the gas burners.

The under side of these cross bars and also the upper end of the upper half portion of the boxes are fitted in close bearing contact with each other.

The casing of the retort rests throughout its length by means of its side flanges on the roof plates 9, and the entire length of the retort moves bodily on the top of these roof plates as the retort expands and contracts. The propeller shaft, however, moves on the lugs of the casing of the retort, and is free to move independently of the retort.

The oil shale rabbling and forwardly feeding or propelling shaft is rotated by a worm gear 127, and a worm pinion 128. The worm gear is keyed on a reduced portion at the end of the shaft, and the pinion is formed on a shaft 129, that is journaled in babbitted boxes 130, that are bolted to a channel shaped bar 130ᴬ, which is bolted to the top of the adjacent side walls of the furnace portion of the retort. The shaft 129 is rotated by a pulley 131, which is secured on it, and is arranged to receive belt power from a source of supply.

The front end of the propeller shaft 114, extends beyond its bearing in the front end plate 119, of the retort, and the pipe connections that are attached to it consist of a short pipe nipple 132, which is threaded into the end of the propeller shaft 114, and a stuffing box 133, surrounds the end of the propeller shaft and the nipple 132. This stuffing box consists of a sleeve member 134, and a flange member 135, which are bolted together. One end of the sleeve member of this stuffing box extends over the end of the shaft and is secured by cap screws 35ᴬ, to a divided slip collar 136, the halves of which fit around a neck portion formed in the shaft, and the sleeve is provided with an interior shoulder 137, that fits around the nipple.

The flanged member 135, of the stuffing box is provided with an inside gland 138, that extends into the sleeve loosely, and a packing space is left between it and the shoulder of the sleeve, in which packing material 139, is placed. This gland 138, extends loosely over the free end of the nipple. The flange 135, is also provided with an outside hub 139ᴬ, to which one end of a pipe 140, is connected, the opposite end of which extends to a supply of cold water, or to a supply of compressed air.

The stuffing box remains stationary, and the shaft with its nipple rotates inside of the divided collar, and the nipple rotates inside of the packing space and the inner hub of the flange, and the water flows through the stuffing box from its source of supply and through the axial aperture in the propeller shaft 114, and out of its opposite end into a pipe 141, that is threaded into it, the outer end of which is provided with a valve 142.

On and along the whole length of the hexagon propeller shaft 114, I detachably and removably secure oil shale rabbling and stirring and forwardly feeding or moving spoke-like radiating blade members that are of a radial length to extend to and almost scrape against the inner peripheral surface or wall of the oil shale treating chamber 29, of the retort 27.

These radial spoke-like blade members of the hexagon shaft consist of hub portions that are divided into two separate half part hub portions 143 and 144, that are of equal size and fit about half way around the hexagon shape of the shaft 114, and are bolted together around the shaft by bolts 145, that extend through lugs 146, that are formed on each half hub. The half part hub 143, of each combined rabbler and propeller is provided with a flat, thin oil shale lifting blade 115, that projects radially from the half hub 143, with its wide side in longitudinal alinement with its hub, and with the longitudinal axis of the shaft. It is positioned on its half hub to project at a slight upward angle from a diametrical line extending through the inner end of it at the point where it joins the back of its half hub. Consequently, it forms a scraping form of blade, on the surface of which the oil shale slides inwardly towards the half hub as the blade moves upwardly as it is rotated by the shaft, with its outer end very close to the inner wall of the semicircular bottom of the oil shale holding chamber of the retort.

The half part hub 144, of each combined oil shale rabbler and propeller is also provided with a flat, thin, radially projecting blade 116. This blade 116, however, stands at an oblique angle to the longitudinal axis of its hub and of the shaft, so that when the lifting blade 115, of the same hub lifts the oil shale above the center of the shaft, it will fall back onto the forwardly and downwardly inclined surface of obliquely positioned blade and slide down its forwardly inclined surface, which will cause it to move slightly forward in the chamber of the retort towards its discharge end.

The amount of the forwardly feeding movement the oil shale receives as it falls from the lifting blade 115, on each obliquely inclined surface of the blade 116, which is shown in Figures 8 and 9, is the same width as the length of its half hub, is about three inches, as that is the preferred length of the hubs, but I use a slightly wider obliquely inclined blade 148, which is shown in Figure 10, that extends beyond its half hub, and I use this wider propeller blade only on the opposite sides of the three depending journal bearing hangers that support the shaft intermediate of its ends, and it is made in right and left hand forms for this purpose.

I clamp these oil shale lifting rabbling and forwardly feeding propellers on the hexagon shaft close together throughout its whole length. I place them in progressive order on the opposite three pairs of sides of the hexagon shaft, by which arrangement six blades radiate from the six surfaces of the shaft, or one blade from each one of the six flat surfaces on the shaft, and they radiate therefrom like the spokes of a wheel, and by this arrangement the flat surface oil shale lifting blades alternate with the obliquely angled surface blades in their radiating circular arrangement around the shaft, and they all fit closely to the semicircular inner wall of the chamber of the retort. Consequently, as the hexagon shaft is rotated, these spoke radiating blades continuously pass through the oil shale that is being fed into the end of the chamber of the retort from the feed hopper by the reciprocating plunger, and rabble it and lift it up, and it continuously falls from the upper surface of the lifting blades onto the obliquely inclined forwardly pitching blades, and is thus moved by a continuous series of short step by step forwardly feeding movements progressively through the heat treating chamber of the retort from its oil shale receiving end to its tailings discharging end, where it falls through the aperture 152, in the bottom of the retort, into and through the tailings receiving spout, from which it is discharged into the tailings receiving tank 16, into and underneath a body of water that is provided with a running supply and is kept in the tailings tank up to an overflow discharge spout 154, that is formed in its rear end.

The tailings may be removed continuously, or from time to time, from the tank 16, through a sluice valve 16ᴬ, and may be conveyed to further treatment, or allowed to run to waste.

In the treatment of some kinds of oil shales, it may facilitate the volatilization and also the condensation of the vaporized gas to admit either constantly, or from time to time, a supply of steam or air, or both, and I have placed an inlet pipe 155, in the elbow 42, that is connected to the top of each of the domes 35, and I also place an inlet pipe 157, in each of the vaporized gas receiving domes 35, close to their base flanges.

The steam or air that enters the domes or the elbow, or both, through these pipes, mingles with the vaporized gas and will flow with it into the air cooled condensers.

The operation of my retort heating furnace and its oil shale treating and vaporized gas producing retort is as follows:

After the heat from the fire box or gas burners, or both, has heated up the oil shale treating retort, the oil shale, which has been crushed to from about ten mesh to small pieces of about a half inch mesh in size, is fed in a dry or nearly dry state into the feed hopper 11, through the bottom of which it feeds by gravity into its discharging spout 95, from which it is fed by the reciprocative plunger 101, into the front end of the heat treatment chamber 29, of the oil shale treating and vaporized gas producing retort portion of my retort furnace, and the oil shale is crowded and packed and forced through the hopper's discharging spout by the reciprocating strokes of the plunger, and the oil shale, owing to its being packed in the discharge spout by the plunger, effectually seals the oil shale passageway through it, against the admittance of air through it into the oil shale treating chamber 29 of the treatment retort of my retort furnace, and the oil shale, when it drops from the discharging spout of the hopper, falls onto the propeller shaft and rabbling, filling and propelling blades, and as the propeller shaft 114, is rotated continuously by its belt pulley worm pinion and worm gear rotating mechanism, its projecting lifting blades move down into and through the oil shale that is being continuously fed into the bottom of the chamber and lifts up such of it as remains on the top of the lifting blades, and carries it up in the chamber until it falls off of them onto their forwardly and downwardly inclined surfaces, which moves it progressively forward slowly through the retort chamber to its opposite and discharge end. It requires three of the hubs placed side by side on the hexagon shaft, to make, with their six radiating blades, a continuous circumferential circular arrangement of the six blades around the shaft. Consequently, assuming that the hubs are three inches long, the oil shale is being moved along the bottom of the chamber nine inches at each revolution of their supporting hexagon shaft 114. The angular surface of the obliquely inclined blades also pushes the oil shale forwardly as they move through it at each revolution of the shaft. Consequently the oil shale is not only continuously rabbled or stirred up and turned over and over, but it is fed continuously forward through the chamber of the retort by a large number of these radiating blades, which are secured close together on the shaft through its entire length of the chamber of the retort, from which it is discharged through the discharge spout, into the tailings receiving tank 16, and this tailings receiving tank is kept full of running water to form a water seal over the tailings discharging end of the spout, so that no air can enter it and flow through it into the oil shale vaporizing chamber, and as the opposite end of the retort chamber is sealed against the admittance of air by the packing of the infeeding oil shale in the discharge spout of the hopper, the chamber of the oil shale treatment portion of my retort furnace is practically air tight. The tailings are hot when discharged from the spout, and the water cools them, and they can be forwarded from the tank to further treatment if desired, or be discharged therefrom as waste.

The heat treatment the oil shale receives as it is fed through the chamber of the retort, causes its volatile elements to pass to a gaseous vapor which rises from the oil shale into the row of gas vapor domes 35, above the chamber 29, of the retort, from which it flows through the elbow and the valved pipe at the top of each dome, into the air condenser 46, of each dome, and from each of the three sets of three air condensers each that are connected together, the gas flows into the submerged coil condensers 53, and from them into the gas purifying tanks 55, and then from them, through the medium of the blower 57, into the gas service tank 61, from which it flows to the main gas supply pipe 26, that extends along the rear side of the furnace, that supplies all of the numerous gas burners within the furnace with gas to heat the retort.

The condensers enable various elements to be extracted from the vaporized oil shale, and from it is recovered by condensation, petroleum oil in particular, from which gasoline, kerosene, benzine, and other voluble liquids are obtained, and also a supply of fuel gas that is sufficient to heat the retort by the arrangement of gas burners in use in the flue of the furnace part of my retort.

A stream of cold water or air, preferably water, is kept constantly flowing under pressure through the axial aperture through the hexagon propeller shaft 114, at all times while the retort is in operation, which keeps the shaft cool enough to prevent its being warped or sprung out of its straight form by the heat in the chamber of the retort; and the cool air is allowed to flow naturally into and out of the gas burners' supporting pedestals 72, which thus keep cool enough to resist any harmful action of the heat in the flue.

In case any of the gas burners get clogged up the coupling 76, can be disconnected from the end of the pipe 74, and the lower part of the double look-in door can be removed, and each of the two gas burning tubes that constitute each complete burner can be lifted out of its holding socket in its supporting pedestal; then the plugs in the ends of the burners can be removed and the inside of the tubes and their gas exit apertures cleaned; but in case they have become burned so that they work unsatisfactorily, they can be quickly replaced by a new pair of burners.

In Figures 22 and 23, I have shown a modified form of the vapor dome which is adapted to prevent harmful results consequent upon vapor explosions from any cause. This dome 35^A, is provided with two oppositely positioned blow-out openings 158, about 6 by 8 inches in size, and these openings are covered with a sheet 159, of mica or thin metal, or one of the various makes of sheet packing suitable for the purpose. And this sheet is clamped to the dome by a rectangular metal frame 160, which overlies the sheet of mica or other material, and is bolted to the dome, as clearly shown in the figures above referred to.

Should a vapor explosion from any cause occur, the covers 159, will be fractured by the pressure from said explosion, whereby the force of the explosion will be expended upon the atmosphere, thus preventing damage to the retort, or possible injury to an attendant.

My invention provides a thoroughly practical and positively operating large daily tonnage capacity retort furnace that has been especially designed for the eduction of oil from oil shale rock and from oil shale that occurs in soft, sandy oil saturated formations, and while I have illustrated and described the preferred construction and arrangement of the several cooperating features of my retort furnace, I do not wish to be limited to the construction and arrangement of them as herein illustrated and described, as changes may be made in them without departing from the spirit of my invention.

Having described my invention, what I claim as new and desire to secure by Letters Patent, is:

1. In a retort furnace for oil shale, the combination of a heat producing furnace, a retort supported and heated by said furnace, with an oil shale propeller shaft rotatably mounted in said retort and provided with radiating blades arranged to rabble and feed said oil shale through the retort, said shaft being provided with an axial passage, and means including a stuffing box on one end of said shaft for conveying a cooling fluid through said shaft, a feed hopper at one end of said retort provided with a discharge spout arranged to discharge into said retort, a plunger reciprocally mounted in said spout, and means including eccentrics connected to said plunger for reciprocating the same.

2. The combination in an oil shale treating retort furnace, of a furnace provided with side walls having a flue space between them, plates on the inner edges of the top of said side walls; an oil shale treating retort supported on said walls and depending from them into said flue, and means including a fire box and gas burners in said furnace for heating said retort, said retort being provided with an oil shale treating chamber having an oil shale feeding-in hopper, a shaft rotatably mounted in said chamber and provided with radiating blades arranged to progressively feed the oil shale in the chamber of said retort, said retort being provided with a plurality of vaporized gas receiving domes along the upper top of its entire length, a pipe outlet connected at one end to each of said domes, and condensers connected to the opposite end of said pipe outlet of each dome.

3. The combination in an oil shale treating retort furnace, of a furnace provided with side walls having a flue space between them, an oil shale treating retort supported on said walls and depending from them into said flue, means including a fire box and gas burners in said furnace for heating said retort, said retort being provided with an oil shale treating chamber having an oil shale feeding-in hopper, a shaft rotatably mounted in said chamber and provided with radiating blades arranged to progressively feed the oil shale in the chamber of said retort, said retort being provided with a plurality of vaporized gas receiving domes along the upper top of its entire length, a pipe outlet connected at one end to each of said domes, and condensers connected to the opposite end of said pipe outlet of each dome, means including piped inlets in said domes and their outlet pipes for admitting air to them, a valve in said outlet pipe arranged to regulate the flow of the vaporized gas to said condensers.

4. In an apparatus of the character described, the combination with supporting walls enclosing a flue span, of a retort U-shaped in cross section, the sides of which terminate in longitudinal flanges which rest on said walls and support said retort, a cover for said retort having a plurality of gas domes, means for feeding material into one end of said retort, an outlet at its opposite end, rotatable means for continuously advancing said material toward said outlet, heating elements in said flue space, and pipes leading from said gas domes.

5. In an apparatus of the character described, the combination with walls enclosing a flue space of a plurality of sections U-shaped in cross section which are bolted together to form a retort, the sides of said sections terminating in longitudinal supporting flanges which rest on opposite walls, a plurality of connected cover sections for said retort, each of which is formed with a gas dome, end plates for said retort, inlet and discharge openings at the respective ends of said retort, hangers on said retort sections, a shaft mounted in said hangers and in said end plates and means for rotating the same, lifting and conveying elements arranged in alternate order on said shaft, heating means in said flue space and pipes leading from said gas domes.

6. In an apparatus of the character described, the combination with walls enclosing a flue space, a retort comprising connected U-shaped sections, the sides of which terminate in longitudinal flanges which rest on opposite walls and support said retort and end plates on said retort; of cross bars supported in said sections, hangers depending from said cross bars, a shaft mounted in said hangers and said end plates, and means for rotating the same, a feed hopper at one end of the retort, an outlet at the opposite end thereof, and conveying and lifting blades on said shaft arranged in alternate order, connected covers for said retort, each of which is formed with a gas dome, pipes leading from said domes, and heating means in said flue space.

7. In an apparatus for the treatment of oil shale and other materials, the combination with walls enclosing a flue space, a retort U-shaped in cross section, the sides of which terminate in longitudinal flanges which rest on opposite walls, and end plates for said retort, said retort having opposing ledges; of cross bars supported on said ledges, hangers depending from said cross bars, a shaft hexagonal in cross section having bearing portions which are mounted in said hangers and end portions which are mounted in the said end plates, divided hubs bolted upon said shaft, having conveying rabbler blades thereon, a feed hopper at one end of the retort, an outlet at the opposite end, means for rotating the shaft, cover plates for the retort having gas domes, pipe leading from said domes, and heating means in said flue space.

8. In an apparatus of the character described, the combination with a longitudinal retort U-shaped in cross section, having an inlet and an outlet, and heating means for the same, of cross bars supported in the top of said retort, hangers depending from said cross bars, a hollow shaft, hexagonal in cross section, supported in said hangers and in the ends of said retort, said shaft being made up of sections having flanged meeting ends which are bolted together, a union rotatably secured upon one end of said shaft, a water supply pipe connected to said union, a cut-off valve at the opposite end of said shaft, conveying rabblers having divided hubs which are bolted together upon said shaft, covers for said retort having gas domes formed thereon, pipes leading from said gas domes, and means for rotating said shaft.

9. In an apparatus of the character described, the combination with a longitudinal retort, having an inlet and an outlet, depending hangers supported therein and a shaft hexagonal in cross section having bearing portions which are mounted in said hangers and in the ends of said retort; of half hub sections which are bolted together on said shaft, one of the half hubs of each pair having a lifting blade and the other a conveying blade, each succeeding pair of half hubs being bolted upon the shaft to position their blades a third of a circle in advance of the corresponding blades of the preceding hub sections, means for rotating said shaft, covers for said retort having gas domes thereon and pipes leading from said gas domes.

10. In an apparatus of the character described, the combination with a longitudinal retort having an inlet hopper and an outlet spout, cross bars supported in said retort and hangers depending therefrom; of a hollow hexagonal shaft made up of connected sections which are supported in said hangers and in the ends of said retort, means for admitting water to the interior of said shaft, and means for rotating the same, half hub sections which are bolted together on said shaft, one of the half hubs of each pair having a lifting blade, and the other a conveying blade, each succeeding pair of half hubs being bolted upon the shaft to position their blades a third of a circle in advance of the corresponding blades of the preceding hub sections, covers for said retort having gas domes, and pipes leading from said gas domes.

11. In an apparatus of the character described the combination with a longitudinal retort, a feed hopper on one end of the same, a slideway beneath the hopper outlet, a plunger in said slideway, means for reciprocating the same, and an outlet at the opposite end of the retort; of hangers supported in said retort, a hollow shaft mounted in said hangers and in the ends of said retort, and means for rotating the same, lifting and conveying blades arranged in alternate order on said shaft, whereby the material fed in by said hopper is continuously agitated and conveyed to said outlet, covers for said retort having gas domes thereon, and pipes for connecting said domes with condensers.

12. In an apparatus of the character described the combination with a longitudinal retort U-shaped in cross section, of covers for said retort comprising pyramidal domes provided with rectangular bases having adjoining flanges which are bolted together, and valved pipes leading from said domes to condensers, cross bars supported in said retort, hangers depending from said bars, a rotatable shaft mounted in said hangers and in the ends of said retort, and having conveying blades thereon, a feed hopper at one end of said retort and an outlet at the opposite end thereof.

In testimony whereof I affix my signature in presence of two witnesses.

CHARLES L. BUCKINGHAM.

Witnesses:
G. SARGENT ELLIOTT,
ELIZABETH SMITH.